(12) United States Patent
Frederiksen et al.

(10) Patent No.: US 12,146,596 B2
(45) Date of Patent: Nov. 19, 2024

(54) QUICK CONNECTOR WITH REMOVABLE VERIFIER

(71) Applicant: COOPER-STANDARD AUTOMOTIVE INC, Northville, MI (US)

(72) Inventors: Stephen S. Frederiksen, Clarkston, MI (US); Alexander C. Bowman, Waterford, MI (US)

(73) Assignee: COOPER-STANDARD AUTOMOTIVE INC, Northville, MI (US)

( * ) Notice: Subject to any disclaimer, the term of this patent is extended or adjusted under 35 U.S.C. 154(b) by 84 days.

(21) Appl. No.: 17/870,080

(22) Filed: Jul. 21, 2022

(65) Prior Publication Data
US 2024/0027008 A1 Jan. 25, 2024

(51) Int. Cl.
*F16L 37/12* (2006.01)
*F16L 37/084* (2006.01)

(52) U.S. Cl.
CPC ....... *F16L 37/1225* (2013.01); *F16L 37/0841* (2013.01); *F16L 2201/10* (2013.01); *Y10T 29/49826* (2015.01)

(58) Field of Classification Search
CPC ............... F16L 37/1225; F16L 2201/10; F16L 37/0841; F16L 37/0985; F16L 37/144
See application file for complete search history.

(56) References Cited

U.S. PATENT DOCUMENTS

| | | | |
|---|---|---|---|
| 5,152,555 A * | 10/1992 | Szabo | |
| 5,401,063 A * | 3/1995 | Plosz | F16L 37/0985 |
| 6,145,886 A * | 11/2000 | Ohta | |
| 9,016,729 B2 | 4/2015 | Ishida et al. | |
| 9,816,652 B2 | 11/2017 | Deplan | |
| 10,385,999 B2 | 8/2019 | Canatella | |
| 10,584,819 B2 | 3/2020 | Greco et al. | |
| 2003/0160448 A1* | 8/2003 | Takayanagi | |
| 2022/0243850 A1* | 8/2022 | Teasley | F16L 37/1225 |

FOREIGN PATENT DOCUMENTS

DE 10223936 B4 * 2/2006

OTHER PUBLICATIONS

DE-10223936-B4—Machine Translation—English (Year: 2006).*

* cited by examiner

*Primary Examiner* — William S. Choi
(74) *Attorney, Agent, or Firm* — Paschall & Associates, LLC; James C. Paschall; Anthony Miologos

(57) ABSTRACT

A quick connector for making a verifiable connection with a tube includes a connector housing having a socket portion and a pair of channels extending into the socket portion from the exterior of the connector housing. A verifier has a pair of resilient legs each including a releasing member extending through a respective channel into the interior of the socket portion. A retainer having claws is held by spring bridging portions within an opening of the socket portion. An upset formed on an exterior surface of the tube is installed into the opening of the socket portion and captured by the retainer claws to lock the tube to the connector housing and deform each resilient leg so as to move and position each releasing member in alignment with its respective channel allowing extraction of the verifier from the connector housing.

17 Claims, 10 Drawing Sheets

QUICK CONNECTOR WITH REMOVABLE VERIFIER

TECHNICAL FIELD

This disclosure is generally directed to quick connectors. More specifically, it relates to quick connector for locking a mating tube into a receptacle and that includes a removable verifier that confirms that the mating tube is installed in the receptacle.

BACKGROUND

In the automotive and other fields, quick connector fluid couplings are often utilized to provide a fluid connection between two components or conduits. Use of quick connectors is advantageous in that a sufficiently sealed and secured fluid line may be established with a minimum amount of time and expense. Known quick connector systems have a coaxial sheath on a female receptacle, which is pushed back manually to engage or to separate from a mating tube. The present invention provides a simplified operation of connecting and disconnecting the mating tube from the female receptacle using only one hand.

An improper connection between the mating tube and female receptacle of a quick connector coupling can have deleterious effects on the fluid line system. At the very least, a leak in the fluid system will occur at the site of the improper connection. More serious and potentially dangerous consequences can result if the fluid is pressurized, as is often the case in automotive fluid systems. Thus, a reliable and accurate means for verifying a proper connection between the mating tube and female receptacle is desirable.

SUMMARY

This disclosure relates to quick connector for locking a mating tube into a receptacle and that includes a removable verifier that confirms that the mating tube is installed in the receptacle.

In a first embodiment a quick connector for making a verifiable connection with a tube is disclosed that comprises a receptacle having a tubular connector housing including a socket portion on one end of the receptacle. The socket portion includes a pair of opening portions extending from the interior to the exterior of the socket portion and a pair of channels extending into the socket portion from a pair of wall members located on the exterior of the connector housing perpendicular to the opening portions. A verifier includes a pair of legs extending from a base portion of the verifier with each leg having a releasing member. Each leg extends through a respective channel into the interior of the socket portion with each releasing member engaging an interior surface of each wall member, preventing the extraction of the verifier from the connector housing. A retainer having inwardly directed engagement claws is connected by spring bridging portions to a pair of outwardly projecting buttons with each button held in a mating fit within a respective opening portion in a preloaded position. An upset is formed on an exterior surface of an insertion end of the tube. The insertion end and the upset are adapted to be installed into the socket portion of the connector housing to lock the tube to the connector housing by a snap-engagement of the engagement claws with the upset and to deform each verifier leg so as to move and position each releasing member in alignment with its respective channel allowing extraction of the verifier from the connector housing and verifying the connection with the tube.

In a second embodiment a process for making a verifiable connection between a tube and a receptacle is disclosed, the process comprising, providing a tubular connector housing including a socket portion on one end of the receptacle. The socket portion including a pair of opening portions extending from the interior to the exterior of the socket portion and a pair of channels extending into the connector housing from a pair of wall members located on the exterior of the connector housing perpendicular to the retainer openings. The process further comprises, installing a verifier having a pair of resilient legs and a releasing member on each leg through a respective socket portion channel into the interior of the socket portion with each releasing member engaging an interior surface of each wall member preventing extraction of the verifier from the connector housing and installing a retainer having inwardly directed engagement claws connected by spring bridging portions to a pair of outwardly projecting buttons. Each button configured to be held in a mating fit within a respective opening portion in a preloaded position. The process additionally comprises, forming an upset on an exterior surface of an insertion end of the tube and inserting the upset into the socket portion of the connector housing to lock the tube to the connector housing by a snap-engagement of the engagement claws with the upset that also deforms each verifier leg into a position wherein, each releasing member is in alignment with its respective channel allowing the extraction of the verifier from the connector housing verifying the connection between the tube and the receptacle.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
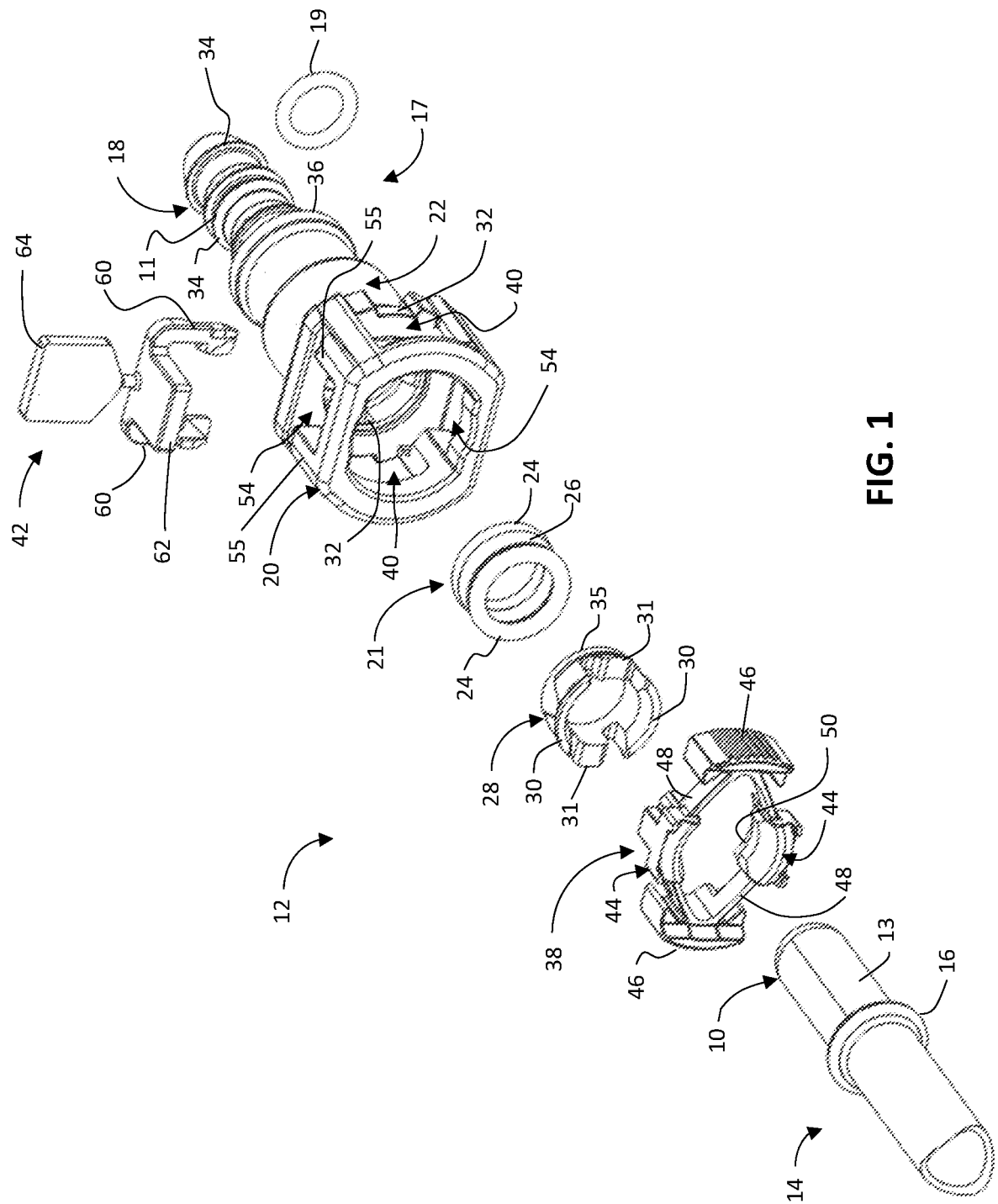
FIG. 1 illustrates an example exploded isometric view of the quick connector with removable verifier in accordance with the present disclosure.

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Reference numeral 12 in FIGS. 1-5 indicate a quick connector used for a quick connection device according to an embodiment of the disclosure. Reference numeral 14 indicates a mating tube, or a pipe that is to be connected via the quick connector 12. The tube 14 is comprised of metal, however, it may also be comprised of a thermoplastic resin. The tube 14 includes an annular projecting upset 16 on an outer peripheral surface 13 at a position near an insertion end 10. Reference numeral 17 indicates a tubular receptacle comprising a main body of the quick connector 12 made entirely of a thermoplastic resin material. Here, the receptacle 17 is shown as a linear form, however, it also may take the form of an elbow or other form extending at any convenient acute or oblique angle.

Figure 5:
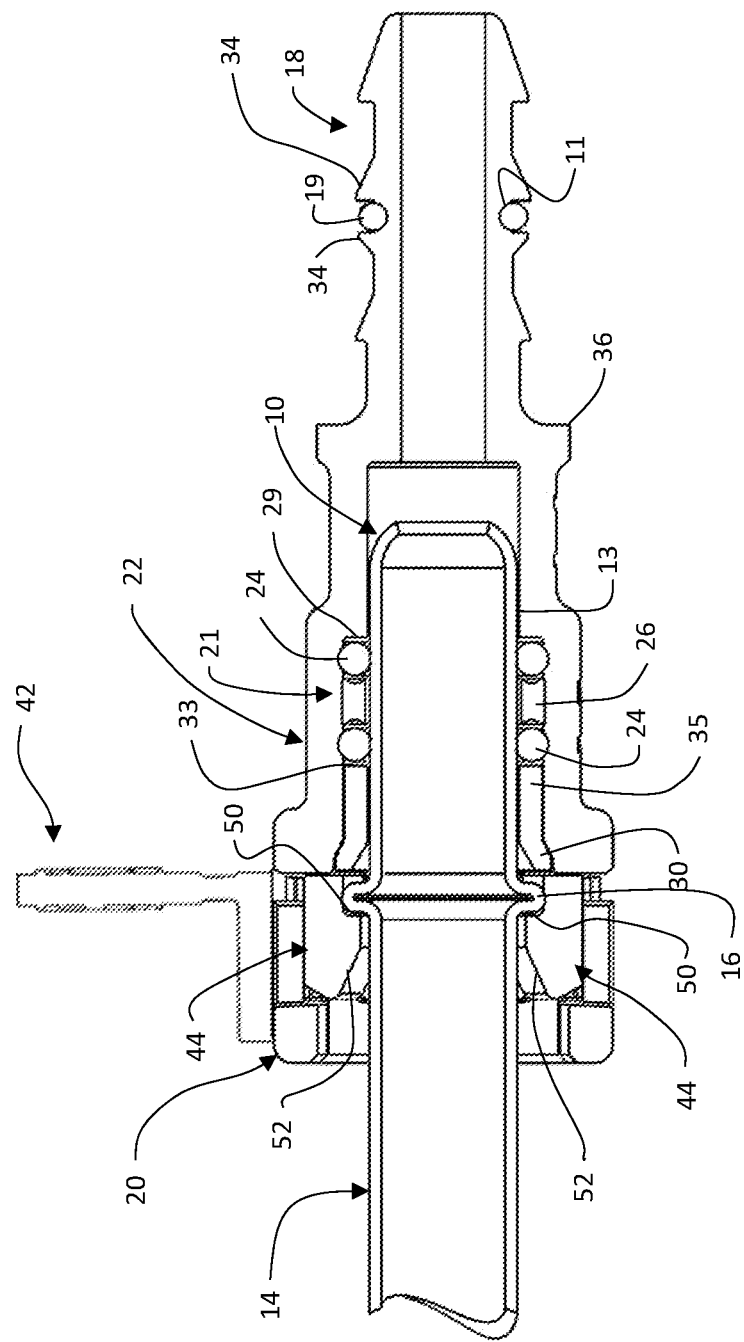
FIG. 5 illustrates an example longitudinal sectional elevation through the assembled quick connector with removable verifier in accordance with the present disclosure.

The receptacle 17 has a connection end 18 for connection to a linking tube (not shown) on one axial end thereof and a connector housing 22 on the other axial end. The connector housing 22 includes a socket portion 20. A sealing assembly 21 is retained inside the connector housing 22. The sealing assembly 21 comprising a pair of elastic O-rings 24 retained together with a resin spacer ring 26. As shown in FIG. 5, the sealing assembly 21 is located within the connector housing 22 having the first O-ring located against an annular face 33 of a front portion of a resin top-hat member 28 and a second O-ring against shoulder 29.

Figure 2B:
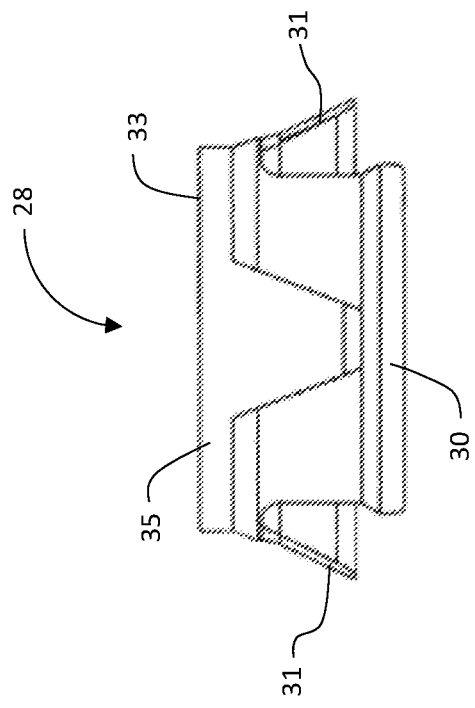
FIG. 2B illustrates an example top plan view of the top-hat member shown in FIG. 2A in accordance with the present disclosure.
Figure 2A:
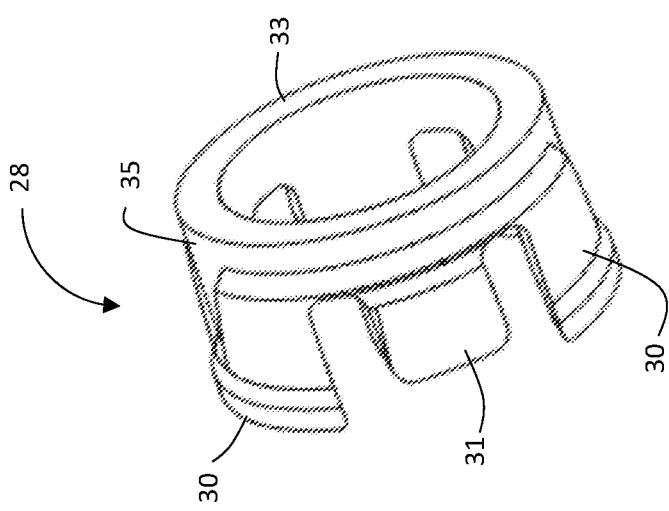
FIG. 2A illustrates an example isometric view of the top-hat member in accordance with the present disclosure.
Figure 3:
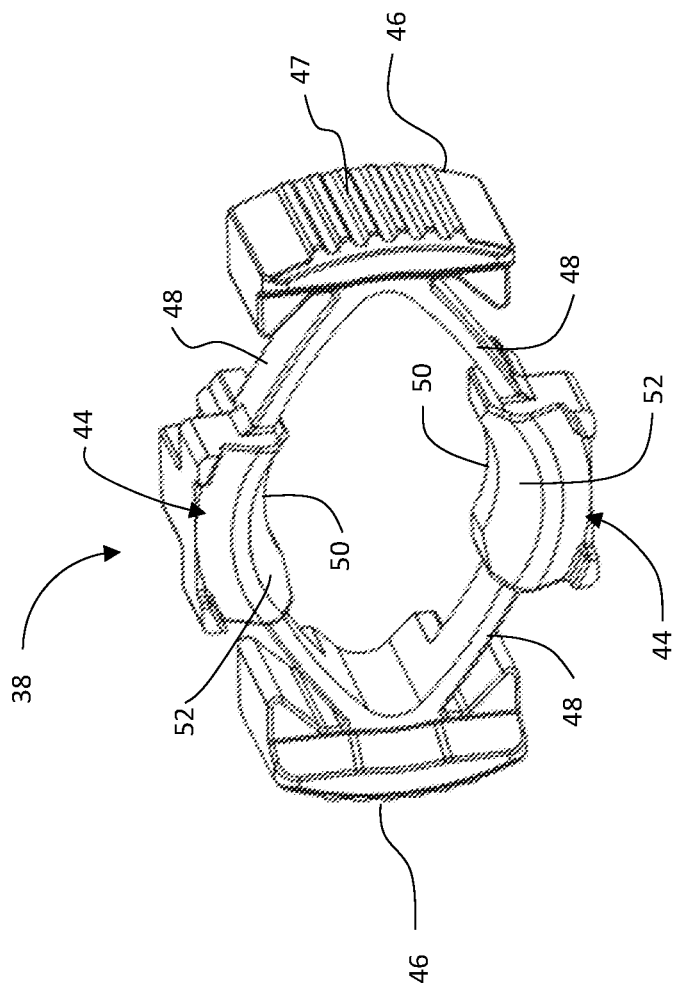
FIG. 3 illustrates an example isometric view of the retainer in accordance with the present disclosure.

The top-hat member 28 is shown in detail in FIGS. 2A and 2B and includes a cylindrical body 35 and a pair of arcuate flange members 30 extending from opposite portions of the cylindrical body 35. Further, the top-hat member 28 includes a pair of wedge shaped projections 31 extending in opposition to the other from opposite portions of the cylindrical body 35 located 90 degrees from the arcuate flange members 30. Each projections 31 is arranged to be accepted within a respective window 32 formed on opposite ends through connector housing 22 to serviceably latch the top-hat member 28 to connector housing 22.

With reference to FIG. 5, the top-hat member 28 is shown installed in connector housing 22. The sealing assembly 21 is retained within the interior of connector housing 22 between the annular face 33 of the top-hat member 28 and the shoulder 29. The sealing assembly 21 may be serviced and or replaced with other forms of sealing assemblies, by pushing each projection 31 through its respective window 32 and slidably removing the top-hat member 28 from the connector housing 22 through socket portion 20. The removal of the top-hat member 28 allowing access to the sealing assembly 21 for maintenance its removal and replacement.

Figure 4:
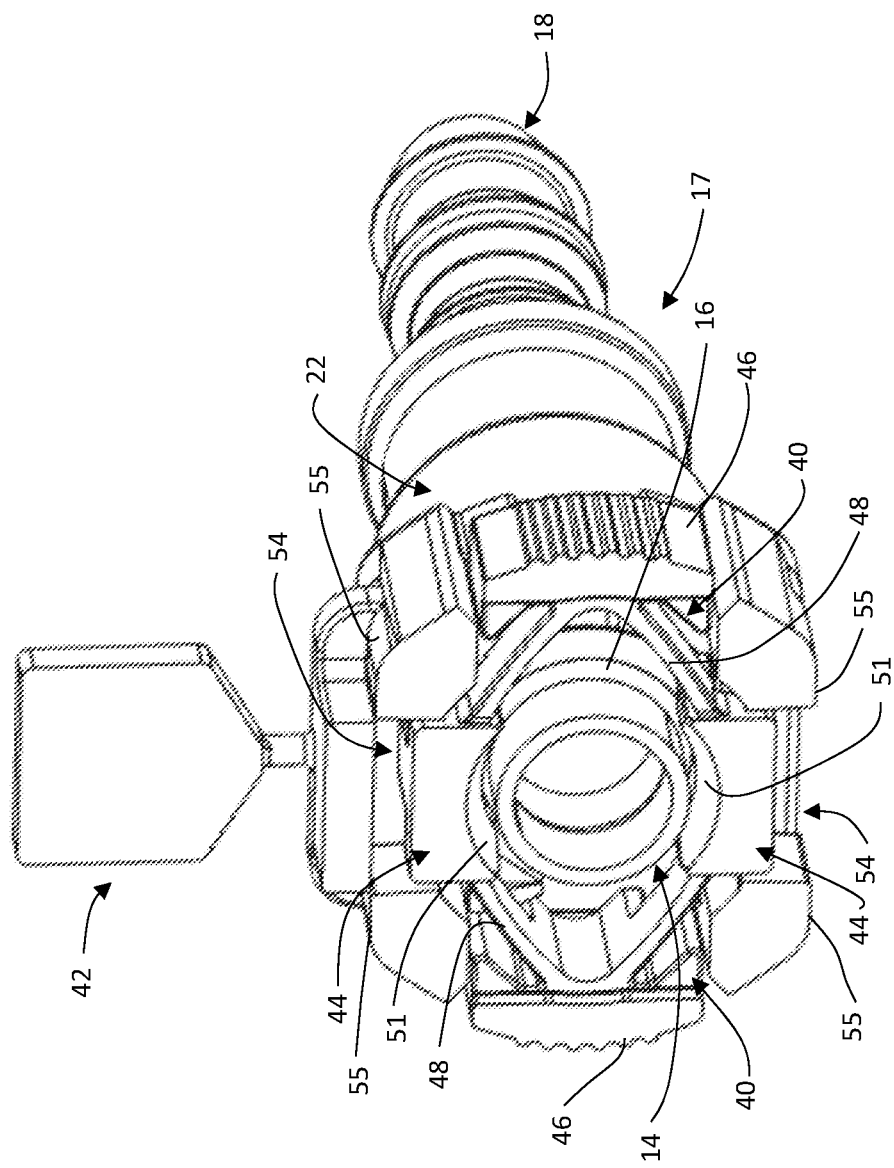
FIG. 4 illustrates an example partial isometric section of the assembled quick connector with removable verifier through the socket portion of the connector housing in accordance with the present disclosure.

The connection end 18 of receptacle 17 is formed with a plurality of annular spines 34 of saw-edged cross-sections with acute angled ridges around an outer periphery as shown in FIGS. 1, 4 and 5. These annular spines 34 bite into an inner surface of the linking tube when the linking tube is press-fit onto connection end 18, to provide retention and a fluid seal between the connection end 18 and the linking tube. A groove 11 is formed between the two of the spines 34 that accepts an O-ring 19 within the groove 11, providing for further fluidic sealing between the inner surface of the linking tube and connection end 18 when the linking tube is installed. A flange portion 36 is formed for controlling the length of the press-fit connection between the connection end 18 and the linking tube.

The socket portion 20 of the connector housing 22 is arranged to accept and house within the socket portion 20 a resin retainer 38, separate from the connector body that provides a lock for the tube 14. The retainer 38 is held and securely fixed axially within the socket portion 20. In the connector housing 22, a verifier 42 is installed, axially behind the retainer 38 and used for verifying complete insertion of the tube 14 with the receptacle 17. That is, a proper connection of the tube 14 in the receptacle 17 of the quick connector 12 is verified by the verifier 42. The retainer 38 is made of resin of a unitary construction and takes a form of a diamond shape as a whole, as shown in FIGS. 1 and 4 and in detail in FIG. 3.

Specifically, the retainer 38 has a pair of clamping members 44 opposed in a vertical direction perpendicular to the linear axis of the receptacle 17 and a pair of buttons 46 opposed to each other in a direction perpendicular to the linear axis of the receptacle 17 and located 90° apart from the clamping members 44, respectively. Thin-plate like springs 48 bridge between the clamping members 44 and the buttons 46, respectively. The pair of clamping members 44 are thick-walled and are provided with radially inwardly directed engaging claws 50 on inner peripheral sides thereof. The retainer 38 serves to lock the tube 14 by engaging the engaging claws 50 with the upset 16 in an axial direction as shown in FIGS. 4 and 5.

Each clamping member 44 includes a cam surface 52 arranged as a downwardly projecting surface on a front face of the clamping member 44 from the engaging claw 50. Cam surface 52 extends continuously from the engaging claw 50, providing an entrance end for inserting the tube 14. The cam surfaces 52 serve to guide the upset 16 when the tube 14 is being inserted in the connector housing 22. The upset 16 causes the pair of the clamping members 44 to move in a mutually separating direction radially with the resilient deformation of the springs 48 as the upset 16 advances in the connector housing 22. The buttons 46 are used to manually exert an operating force to disengage the engaging claws 50 from the upset 16. A pushing force applied to a face 47 of each button 46, causes each button 46 to move in a mutual direction towards each other, whereby, the pair of the engaging claws 50 are spread radially outward deforming the springs 48 to disengage the engaging claws 50 from the upset 16 and allowing the extraction of the tube 14 from the retainer 38.

As best seen in FIGS. 1 and 4, the connector housing 22 has a pair of opening portions 40 extending through socket portion 20 thereof from outside to the inside, of the socket portion 20 having shapes corresponding to the buttons 46. The retainer 38 is set in the socket portion 20 so as to locate a button 46 in an opening portion 40. Fitting of the buttons 46 in a respective opening portion 40 also serves to position the retainer 38 in the axial direction to the connector housing 22, specifically, each button 46 extends through a respective opening portion 40 in a direction perpendicular to an axis with the pair of the clamping members 44 and set in a preloaded position. Additionally, each clamping member 44 is associated with a recess 54. Each recess 54 extends through the socket 20 from the inside to the outside between a pair of wall members 55 located on opposite ends of the recess 54. Each recess 54 having a shape corresponding to a respective clamping member 44. When the tube 14 is inserted in the connector housing 22 a certain length, the upset 16 of the tube 14 abuts the cam surfaces 52 of the clamping members 44 of the retainer 38. When the tube 14 is further inserted, the upset 16 further advances, whereby the pair of the clamping members 44 spread apart in a radial direction outward due to the camming function of surfaces 52. The radial movement of each clamping member 44 causes each clamping member to enter a respective recess 54 allowing for the full outward motion of the clamping members 44 about the upset 16.

As soon as the upset 16 passes through the engaging claws 50 of the retainer 38, the clamping members 44 contract radially inward to their preloaded positions, and the engaging claws 50 lock with the upset 16 in the axial direction as shown in FIGS. 4 and 5, locking the tube 14 within connector housing 22. At the same time, the outer peripheral surface 13 of insertion end 10 fits into and through the top-hat 28 and the sealing assembly 21, wherein the O-rings 24 seal against surface 13 forming a fluid-tight seal between the insertion end 10 of tube 14 and the receptacle 17.

Figure 6:
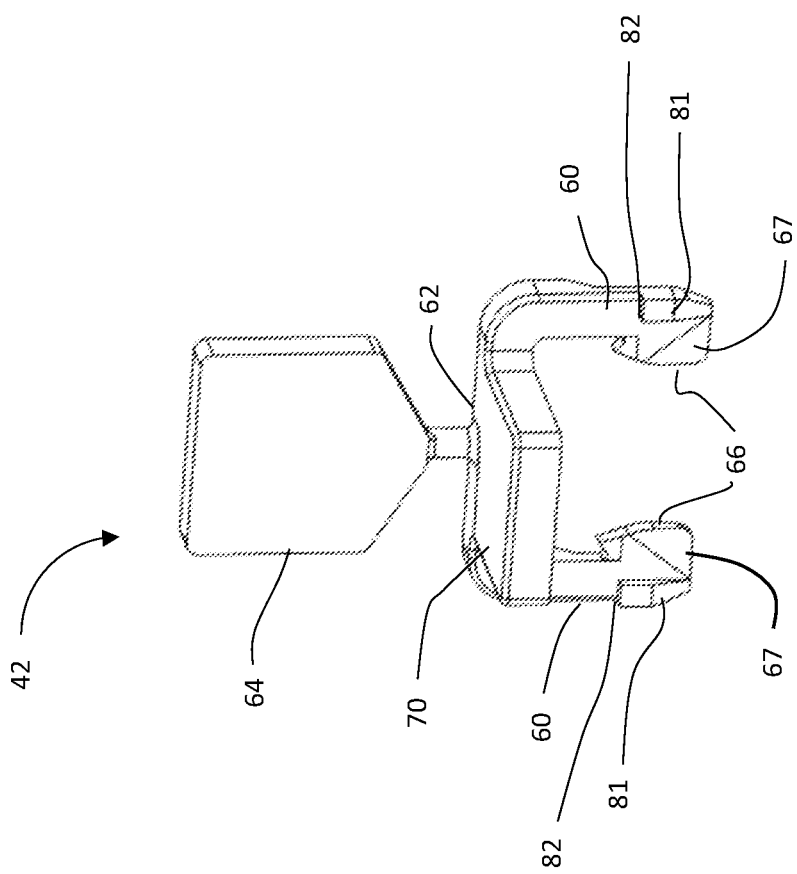
FIG. 6 illustrates an example isometric view of the verifier in accordance with of the present disclosure.

FIGS. 1 and 6-10 illustrate the verifier 42 of the present embodiment and used to confirm the proper connection of the tube 14 to the receptacle 17. The verifier 42 shown in detail in FIG. 6, is constructed as a single unitary structure from a resin material, and as a whole takes the form of a U-shape. The verifier 42 has a pair of resilient legs 60 extending parallel to each other from a base portion 62 that connects the source ends of the resilient legs 60. The base portion 62 is provided with a handle 64 and a cover 70 extending from the base portion 62 between and perpendicular to the pair of resilient legs 60. The handle 64 of the present embodiment is shown being shield shaped. It will be appreciated that other shapes may be used for the handle, such as for example, a ring, a T-handle, or a flag having a square or rectangular form.

The pair of the resilient legs 60 have inwardly directed fingers 66 each having a sloped face 67 on a front face of each finger 66. The front face of each of the pair of the resilient legs 60, further includes a releasing member 81 comprised of wedge shaped protrusion extending outward from an edge of each of the pair of the resilient legs 60. A a shoulder surface 82 extends perpendicularly from each resilient leg 60 at from a top portion of each releasing member 81. The front face of each finger 66 and its respective sloped face 67 as well as each releasing member 81 when installed in the socket portion 20, faces the entrance end of the socket portion 20 that accepts the tube 14 therein.

Figure 7:
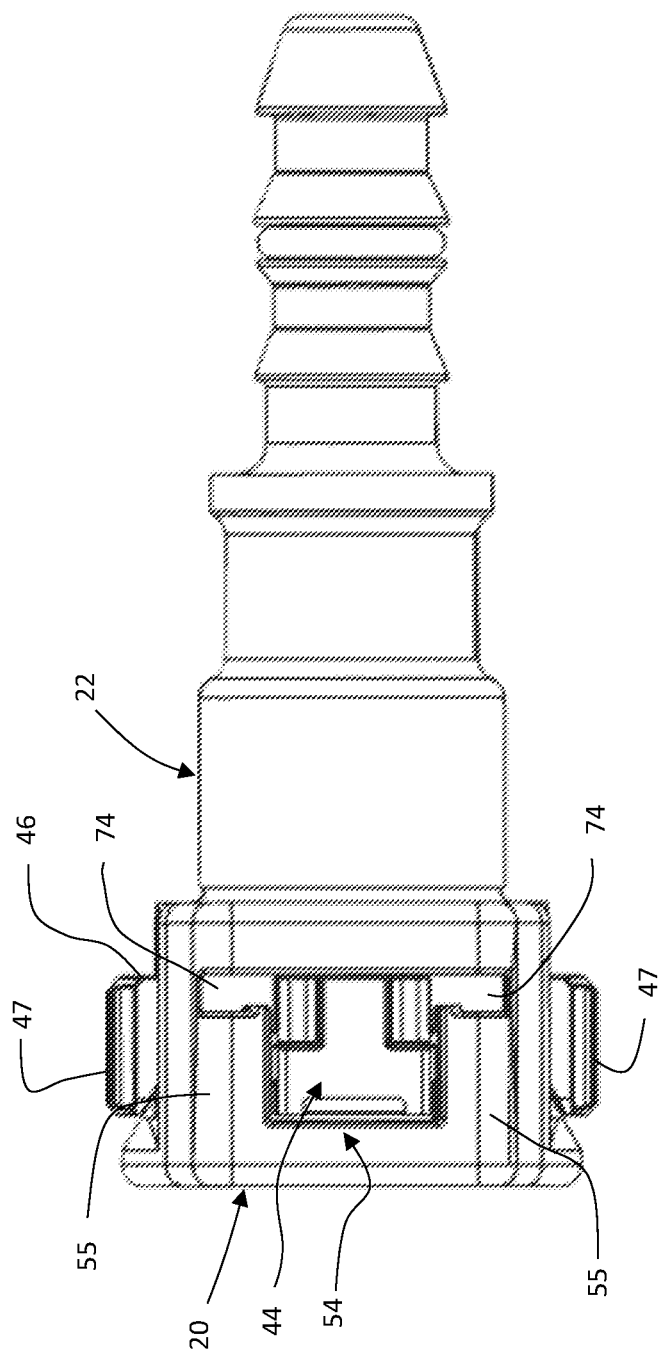
FIG. 7 illustrates an example top plan view of the receptacle before installation of the verifier in accordance with the present disclosure.

As shown in FIG. 7, the socket portion 20 of connector housing 22 is formed with a pair of channels 74 apertured through the socket portion 20 wall members 55 from outside to inside through each wall member 55 and sized to accept by insertion the resilient legs 60 of the verifier 42 therethrough. Channels 44 are located on either side and slightly behind a top clamping member 44. Each resilient leg 60 of verifier 42 is installed in a respective channel 74 having the front face of each finger 66 and its respective sloped face 67 as well as each releasing member 81 facing the entrance end of the socket portion 20. The legs 60 of the verifier are inserted into channels 74 until the base portion 70 rests on top of wall members 55 over recess 54.

Figure 8:
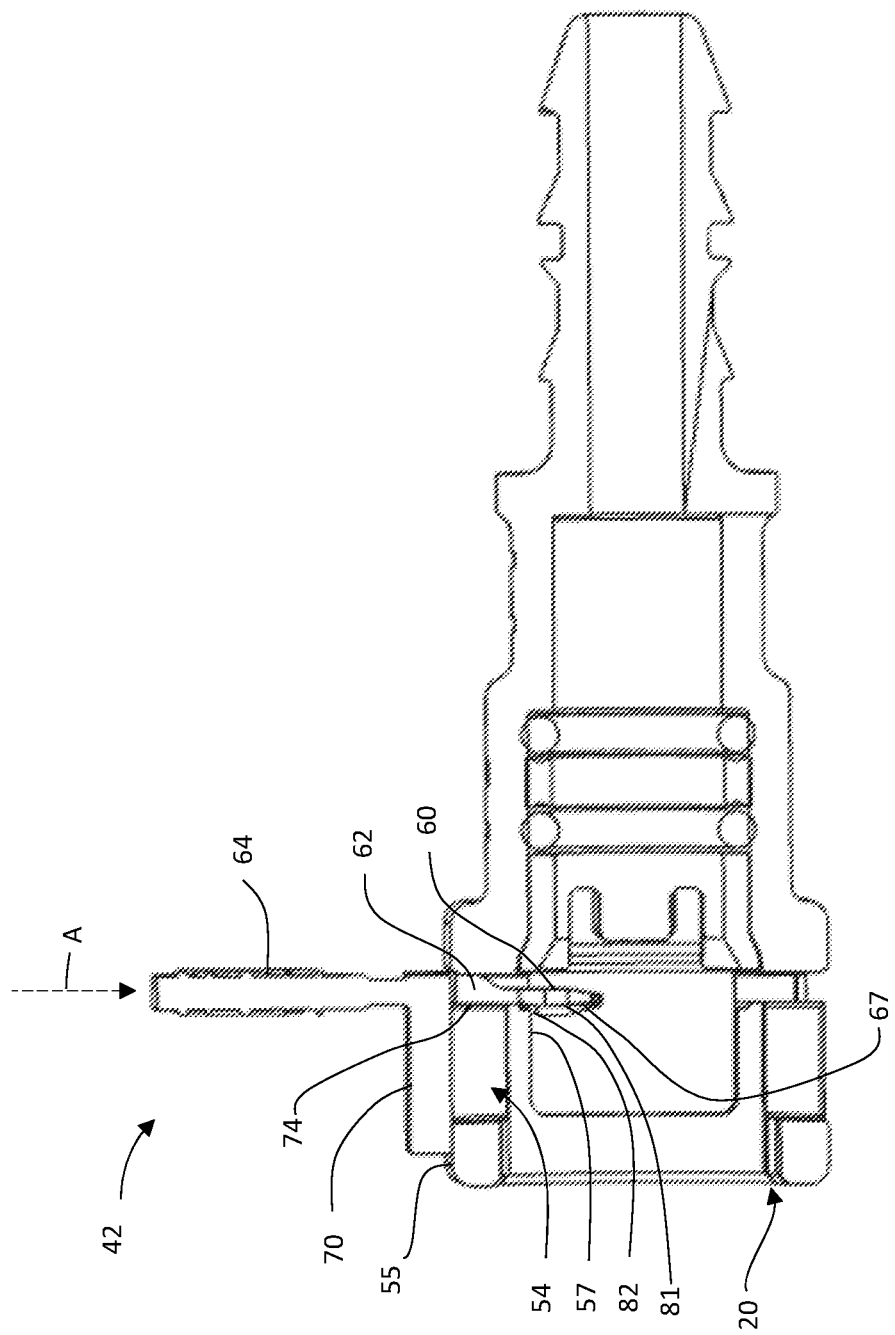
FIG. 8 illustrates an example longitudinal sectional elevation through the receptacle showing the verifier installed in the connector housing in the installed condition in accordance with the present disclosure.

With reference to FIG. 8, the verifier 42 is shown in an installed condition within socket portion 20. FIG. 8 is shown without the retainer 38 to illustrate the installed condition more clearly. As shown, the verifier 42 is installed in the socket portion 20 in a manner such that the sloped face 67 as well as each releasing member 81 of the pair of the resilient legs 60 face the entrance end of the socket portion 20 and the insertion direction of the tube 14. Each leg 60 is placed in a respective channel 74 and urged downward in direction A to place each leg 60 within the interior of socket portion 20. When the resilient legs 60 are fully installed through channels 74, base portion 62 locates each leg 60 and it associated releasing members 81 in a forward orientation, positioning shoulder surface 82 under an inner surface 57 of each wall member 55. Each shoulder surface 82 is arranged to engage the inner surface 57 of a respective wall member 55. In the installed condition, a force applied to the verifier 64 in a direction opposite of direction A in order, for example, to extract the verifier 42 would be prevented by shoulder surface 82 engaging against inner surface 57, thereby resisting the extraction of the verifier in the installed condition.

Figure 9:
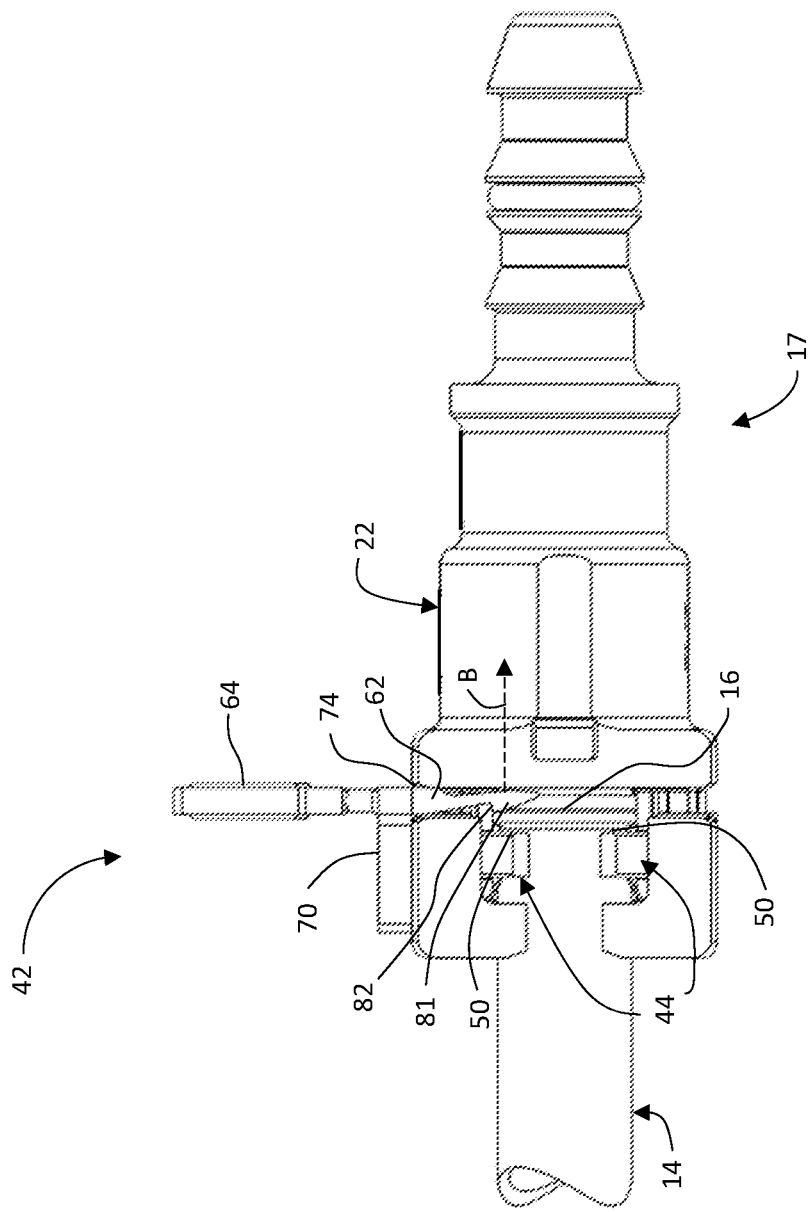
FIG. 9 illustrates an example sectional view through the socket portion of the receptacle when the verifier is placed in the extraction condition in accordance with the present disclosure.
Figure 10:
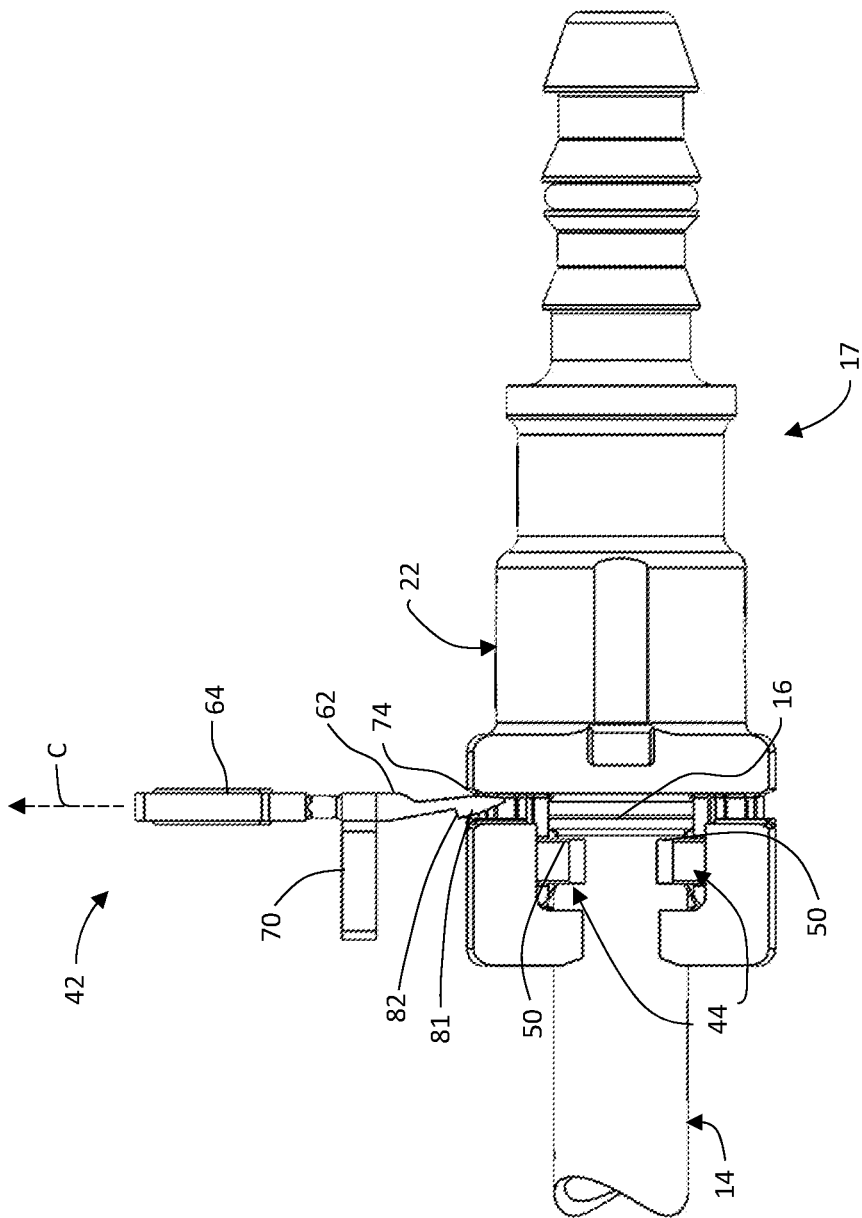
FIG. 10 illustrates an example sectional view through the socket portion of the receptacle showing the extraction of the verifier from the receptacle in accordance with the present disclosure.

The verifier 42 may only be extracted upon the insertion of the tube 14. As is shown in FIG. 9, when the tube 14 is inserted into the socket portion 20, the upset 16 first abuts the cam surfaces 52 of the retainer 38. Further insertion of mating tube 14 moves the upset 16 between the directing claws 50 while spreading apart the cam surfaces 52. When the upset 16 moves beyond the engaging claws 50 the clamping members return to their preloaded positions locking upset 16 with the engaging claws 50 in the axial direction. When the upset 16 becomes engaged with engaging claws 50, the upset 16 also contacts each of the verifier's resilient legs 60. The upset 16 engages the inwardly slopped face 67 of each resilient leg 60 deflecting each resilient leg 60 away from the upset 16, in direction B, placing the verifier 42 into an extraction condition. In the extraction condition the releasing members 81 are also moved rearward in direction B placing shoulders 82 of each releasing member 81 in alignment with each channel 74 and away from the inner surfaces 57. At that time, the handle 64 can be grasped and the verifier 42 pulled in direction C, namely in an upward direction as shown in FIG. 10. Each resilient leg 60 and releasing members 81 are pulled out of the channels 74 removing the verifier 42 from the socket portion 20 of connector housing 22, thereby confirming a proper installation of the tube 14 to the receptacle 17.

The cover 70 of verifier 42 may include a machine scannable code on either a top or bottom surface of the cover 70 that may be read by a hand held optical scanner to record that a proper installation of the quick connector 12 was made.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A quick connector for making a verifiable connection with a tube, the quick connector comprising:
   a receptacle having a tubular connector housing including a socket portion on one end of the receptacle, the socket portion including a pair of opening portions extending from an interior to an exterior of the socket portion and a pair of channels extending into the socket portion from a pair of wall members located on the exterior of the connector housing perpendicular to the opening portions;
   a verifier having a pair of resilient legs extending from a base portion of the verifier, each resilient leg including a releasing member having an inwardly directed finger extending from each resilient leg, the finger including a front face having a sloped surface and a wedge shaped protrusion with a shoulder surface defining a top surface of the wedge shaped protrusion extending outward from each resilient leg, wherein each resilient leg extends through a respective channel into the interior of the socket portion with each releasing member top surface engaging an interior surface of each wall member that prevents the extraction of the verifier from the connector housing;
   a retainer having inwardly directed engagement claws connected by spring bridging portions to a pair of outwardly projecting buttons, each button configured to be held in a mating fit within a respective opening portion in a preloaded position; and
   an upset formed on an exterior surface of an insertion end of the tube, the insertion end and upset adapted to be installed into the socket portion of the connector housing and to lock the tube to the connector housing by a snap-engagement of the engagement claws with the upset and to deform each resilient leg to move and position each releasing member in alignment with the respective channel of each resilient leg allowing extraction of the verifier from the connector housing verifying the connection with the tube.

2. The quick connector of claim 1, wherein the quick connector further comprises:
   a pair of windows extending through the connector housing;
   a shoulder formed in the interior of the connector housing;
   a sealing assembly located against the shoulder; and
   a top-hat member having cylindrical body and an annular face on a front portion of the cylindrical body and a pair of wedge shaped projections outwardly extending from opposite portions of the top-hat member cylindrical body,
   wherein the top-hat member is installed through the socket portion to allow each wedge shaped projection to be accepted within a respective window serviceably latching the top-hat member to the connector housing and retaining the sealing assembly between the top-hat member front face and the shoulder.

3. The quick connector of claim 2, wherein the sealing assembly includes a first elastic sealing ring and a second elastic sealing ring and a spacer ring located therebetween, the second elastic sealing ring located against the shoulder and the first elastic sealing ring located against the top-hat member front face.

4. The quick connector of claim 2, wherein the top-hat member is removed from the connector housing by pushing each of the wedge shaped projections inward into the interior of the connector housing and extracting the top-hat member through the socket portion.

5. The quick connector of claim 1, wherein the quick connector includes a connection end adapted to be connected to a linking tube on another axial end of the receptacle from the connector housing, the connection end including a plurality of annular spines with acute angled ridges around an outer periphery of the connection end that bite into an inner surface of the linking tube when the linking tube is press-fit onto the connection end providing retention and a fluid seal between the receptacle and the linking tube.

6. The quick connector of claim 5, wherein the connection end includes a groove formed between two spines and an elastic sealing ring installed within the groove.

7. The quick connector of claim 1, wherein the retainer further includes:
   a pair of clamping members opposed in a vertical direction perpendicular to a linear axis of the receptacle and to the pair of buttons, the pair of clamping members each provided with the inwardly directed engaging claws on inner peripheral sides thereof; and
   a plurality of spring bridging portions connected between each of the pair of clamping members and a respective button,
   wherein each clamping member is urged away from the other from the preloaded position when each button is pushed toward the other.

8. The quick connector of claim 7, wherein the pair of clamping members each include a downwardly projecting cam surface on a front face of each clamping member extending continuously from the engaging claw of each clamping member, each cam surface receiving the upset of the tube when the tube is installed in the socket portion, the upset spreading each clamping member apart as the upset forces each clamping members from the preloaded position until the upset travels beyond the cam surfaces, wherein the clamping members return to their preloaded position making the snap-engagement that latches the engagement claws with the upset.

9. The quick connector of claim 1, wherein the verifier further includes:
   a handle extending from the base portion perpendicularly to and between each resilient leg; and
   each releasing member wedge shaped protrusion extends outward from each front face of each finger.

10. The quick connector of claim 9, wherein in an installed condition the resilient legs are installed within a respective connector housing channel to the interior of the socket portion with each resilient leg sloped surface facing the entrance of the socket portion and each shoulder surface directly under the interior surface of each wall member preventing extraction of the verifier from the connector housing.

11. The quick connector of claim 10, wherein in an extraction condition the legs are urged backward by the engagement of the engagement claws with the upset allowing the upset to contact each resilient leg sloped surface deforming each resilient leg to move and position each protrusion shoulder surface away from the interior surface of each wall and aligning each protrusion shoulder surface and wedge shaped protrusion with the respective channel of the socket portion allowing the extraction of each resilient leg from the connector housing channels by a pulling force applied to the handle until the verifier is extracted from the connector housing.

12. A process for making a verifiable connection between a tube and a receptacle, the process comprising:
   providing a tubular connector housing including a socket portion on one end of the receptacle, the socket portion including a pair of opening portions extending from an interior to an exterior of the socket portion and a pair of channels extending into the connector housing from a pair of wall members located on the exterior of the connector housing perpendicular to the retainer openings;
   providing a verifier having a pair of resilient legs and a releasing member on each leg, each releasing member having an inwardly directed finger extending from each resilient leg, the finger including a front face having a sloped surface and a wedge shaped protrusion with a shoulder surface defining a top surface of the wedge shaped protrusion extending outward from each resilient leg;
   installing each resilient leg through a respective channel of the socket portion into the interior of the socket portion with each releasing member engaging an interior surface of each wall member preventing extraction of the verifier from the connector housing;
   installing a retainer having inwardly directed engagement claws connected by spring bridging portions to a pair of outwardly projecting buttons, each button configured to be held in a mating fit within a respective opening portion in a preloaded position; and
   forming an upset on an exterior surface of an insertion end of the tube and inserting the upset into the socket portion of the connector housing to lock the tube to the connector housing by a snap-engagement of the engagement claws with the upset that also deforms each verifier leg into a position wherein each releasing member is in alignment with its respective channel allowing the extraction of the verifier from the connector housing verifying the connection between the tube and the receptacle.

13. The process of claim 12, wherein the process further includes:
   forming a pair of clamping members opposed in a vertical direction perpendicular to a linear axis of the receptacle to the pair of buttons, the pair of clamping members each provided with the inwardly directed engaging claw on inner peripheral sides thereof; and
   forming a plurality of spring bridging portions connecting each of the pair of clamping members to a respective button, wherein each clamping member is urged away from the other from the preloaded position when each button is pushed toward the other.

14. The process of claim 13, wherein the pair of clamping members each include a downwardly projecting cam surface on a front face of each clamping member extending continuously from the engaging claw of each clamping member, the process further including: receiving by each cam surface the upset of the tube when the tube is installed in the socket portion, the upset spreading each clamping member apart as the upset forces each clamping member from the preloaded position until the upset travels beyond the cam surfaces, wherein the clamping members return to their preloaded position making the snap-engagement that latches the engagement claws with the upset.

15. The process of claim 12, wherein the verifier includes a handle extending from the base portion perpendicularly to and between each resilient leg.

16. The process of claim 15, wherein the process includes:
   placing the verifier in an installed condition by installing each resilient leg within a respective connector housing channel to the interior of the socket portion with each leg sloped surface facing the entrance of the socket portion and each shoulder surface directly under the interior surface of each wall member preventing extraction of the verifier from the connector housing.

17. The process of claim 16, wherein the process further includes:
   placing the verifier in an extraction condition by locking the engagement claws with the upset allowing the upset to contact each resilient leg sloped surface and deform each resilient leg to move and position each protrusion shoulder surface away from the interior surface of each wall and align each protrusion shoulder surface and wedge shaped protrusion with the respective channel of the socket portion, allowing the extraction of each resilient leg from the respective channel of the connector housing by a pulling force applied to the handle until the verifier is extracted from the connector housing.

* * * * *